(12) United States Patent
Hsieh

(10) Patent No.: US 9,134,841 B2
(45) Date of Patent: Sep. 15, 2015

(54) SINGLE POINT-MULTI-FINGER GESTURES FOR TOUCH PANEL

(75) Inventor: Kin-Hsing Hsieh, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 120 days.

(21) Appl. No.: 13/564,433

(22) Filed: Aug. 1, 2012

(65) Prior Publication Data

US 2013/0113728 A1    May 9, 2013

(30) Foreign Application Priority Data

Nov. 8, 2011    (TW) .............................. 100140658 A

(51) Int. Cl.
*G06F 3/041*    (2006.01)
*G06F 3/044*    (2006.01)
*G06F 3/045*    (2006.01)

(52) U.S. Cl.
CPC .............. *G06F 3/0414* (2013.01); *G06F 3/044* (2013.01); *G06F 3/045* (2013.01); *G06F 3/0416* (2013.01)

(58) Field of Classification Search
CPC .................. G06F 2203/04105; G06F 3/03545; G06F 3/03547; G06F 3/0383; G06F 3/041
See application file for complete search history.

(56) References Cited

U.S. PATENT DOCUMENTS

| 8,564,553 | B2 | 10/2013 | Yeh et al. |
| 2008/0024454 | A1 | 1/2008 | Everest |
| 2008/0036743 | A1 | 2/2008 | Westerman et al. |
| 2008/0042994 | A1* | 2/2008 | Gillespie et al. .............. 345/174 |
| 2011/0242022 | A1 | 10/2011 | Wen |
| 2012/0105358 | A1* | 5/2012 | Momeyer et al. ............. 345/174 |
| 2012/0223895 | A1* | 9/2012 | Lu et al. ........................ 345/173 |

FOREIGN PATENT DOCUMENTS

| CN | 101495951 | 7/2009 |
| CN | 201302702 | 9/2009 |
| CN | 201392511 | 1/2010 |
| CN | 101887332 | 11/2010 |
| CN | 102087565 | 6/2011 |
| TW | 201135565 | 10/2011 |

OTHER PUBLICATIONS

English language translation of abstract of CN 101495951 (published Jul. 29, 2009).

(Continued)

*Primary Examiner* — Tony N Ngo
*Assistant Examiner* — Kin-Hsing Hsieh
(74) *Attorney, Agent, or Firm* — McClure, Qualey & Rodack, LLP

(57) ABSTRACT

A controlling device applied to a touch panel. The controlling device includes a sampling module, a determining module and a reporting module. The sampling module samples electrical signals of the touch panel, and generates at least one trigger signal corresponding to the at least one touch event when at least one touch event occurs on the touch panel. The determining module determines whether the at least one touch event is a single-point-multi-finger gesture according to a position of the at least one trigger signal and sampled physical quantity. The reporting module reports the at least one touch event when the determining module determines that the at least one touch event corresponding to the at least one trigger signal is the single-point-multi-finger gesture.

14 Claims, 12 Drawing Sheets

(56) References Cited

OTHER PUBLICATIONS

English language translation of abstract of CN 201302702 (published Sep. 2, 2009).
English language translation of abstract of CN 201392511 (published Jan. 27, 2010).
English language translation of abstract of CN 101887332 (published Nov. 17, 2010).
English language translation of abstract of CN 102087565 (published Jun. 8, 2011).
English language machine translation of TW 201135565 (published Oct. 16, 2011).

* cited by examiner

SINGLE POINT-MULTI-FINGER GESTURES FOR TOUCH PANEL

CROSS REFERENCE TO RELATED APPLICATIONS

This Application claims priority of Taiwan Patent Application No. 100140658, filed on Nov. 8, 2011, the entirety of which is incorporated by reference herein.

BACKGROUND OF THE INVENTION

1. Field of the Invention

The invention relates to touch panel technology and more particularly to motion detection of touch panels.

2. Description of the Related Art

Electronic devices have been utilized widely and provide versatile functions, such as phone communications, electronic messaging, multimedia information processing, accessing networks, etc. With the development of technology, the current trend is toward electronic devices with more versatility and user-friendly operations.

For convenience of inputting information or reducing size of electronic devices, touch panels are used as the user interface for many electronic devices, such as touch panels of notebooks and touch screens of smart phones. A user uses fingers or a touch pen to contact a touch panel so as to input information into an electronic device. When the user contacts the touch panel, a control system of the touch panel drives connected devices or performs functions according to pre-programmed software. Therefore, the touch panel takes the place of a mechanical button panel.

Conventional single-point-single-finger gestures are limited, and thus multi-point-multi-finger technologies have been developed. A touch panel with multi-point-multi-finger functions may recognize (sense) multiple touch points simultaneously to make a user have more ways to input information. However, in many applications, such that the instructions with multiple meanings with a single cursor is needed. For example, pressing a left key, a middle key and a right key of a mouse at the same place have different meanings and instructions for a conventional windows operating system.

Take a computer game, Minesweeper, as an example. A user may press the left key or the right key at the same place (square) to sweep a mine (reveal the square) or set a flag, respectively. When using single-point-single-finger technologies, the user can't make instructions with multiple meanings at the same place (cursor). If multi-point-multi-finger technologies are used to make instructions with multiple meanings at the same place, cooperation with other touch buttons is needed to indicate whether the user wants to sweep a mine (reveal the square) or set a flag, and accordingly, the user may feel that this method is inconvenient and not intuitional.

BRIEF SUMMARY OF THE INVENTION

In view of this, the invention provides a touch sensing system, which increases instructions at a single point through detecting single-point-multi-finger gestures so as to make the touch panel have more versatile functions.

An embodiment of the invention provides a controlling device applied to a touch panel, comprising: a sampling module, sampling electrical signals of the touch panel, and when at least one touch event occurs on the touch panel, generating at least one trigger signal corresponding to the at least one touch event; a determining module, determining whether the at least one touch event is a single-point-multi-finger gesture according to a position of the at least one trigger signal and sampled physical quantity; and an reporting module, reporting the at least one touch event when the determining module determines that the at least one touch event corresponding to the at least one trigger signal is the single-point-multi-finger gesture.

Another embodiment of the invention provides a method for determining single-point-multi-finger gestures, applied to a touch panel, comprising: sampling electrical signals of the touch panel, and when at least one touch event occurs on the touch panel, generating at least one trigger signal corresponding to the at least one touch event; determining whether the at least one touch event is a single-point-multi-finger gesture according to a position of the at least one trigger signal and sampled physical quantity; and reporting the at least one touch event when the at least one touch event corresponding to the at least one trigger signal is determined as the single-point-multi-finger gesture.

Still another embodiment of the invention provides a touch pen for generating single-point-multi-finger gestures, comprising: a physical quantity changing device, wherein when the touch pen performs at least one touch event on a touch panel, the physical quantity changing device changes a physical quantity of a trigger signal corresponding to the at least one touch event and a controlling device of the touch panel determine that the at least one touch event is a single-point-multi-finger gesture based on the change of the physical quantity.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
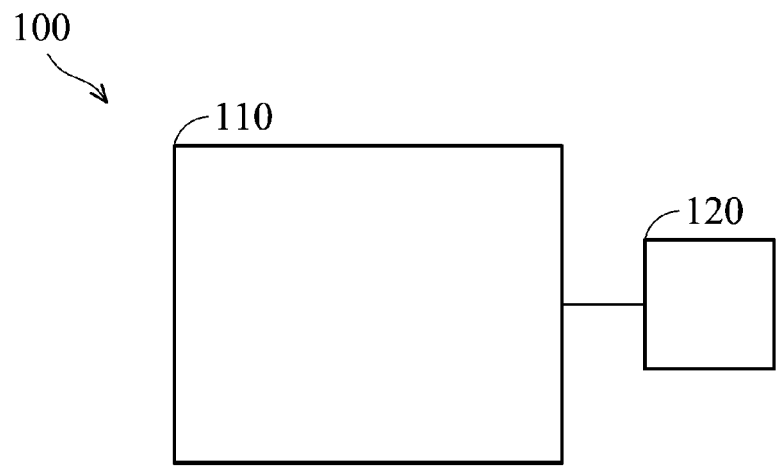
FIG. 1 is a block diagram of a touch sensing system according to an embodiment of the invention.

FIG. 1 is a block diagram of a touch sensing system 100 according to an embodiment of the invention. The touch sensing system 100 comprises a touch panel 110 and a controlling device 120. The controlling device 120 may be a general-purpose processor. When at least one touch event occurs on the touch panel 110, for example, when a user puts his/her fingers on the touch panel 110, the touch panel generates at least one trigger signal corresponding to the at least one touch event. The controlling device 120 determines whether the at least one touch event is a single-point-multi-finger gesture according to the at least one trigger signal. In the invention, the touch panel 110 may be a resistive touch panel, a capacitive touch panel or a pressure-sensing touch panel. Further more, the sensing way of the touch panel 110 may be a resistive-and-pressure-sensing type or a capacitive-and-pressure-sensing type sensing way. Embodiments of the invention are explained with a resistive touch panel and a capacitive touch panel as follows.

Figure 2:
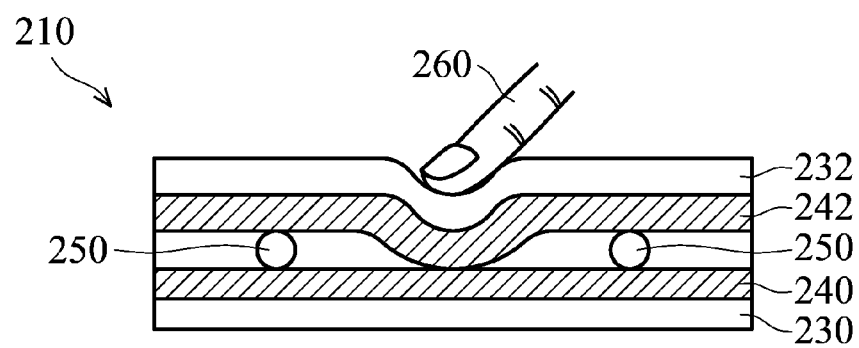
FIG. 2 is a side view of a resistive touch panel.

FIG. 2 is a cross-sectional view of a resistive touch panel 210. The resistive touch panel 210 comprises a glass substrate 230 and a flexible film 232. An indium tin oxide (ITO) layer 240 is configured on a surface of the glass substrate 230. An ITO layer 242 is configured on a surface of the flexible film 232. There is a plurality of space dots 250 between the ITO layer 240 and the ITO layer 242, such that the two ITO layers do not have any contact with each other. When a finger 260 presses the flexible film 232, the ITO layer 242 has deformation and then contacts the ITO layer 240 to form a closed path. Electrodes (such as X+, X−, Y+ and Y− electrodes) are configured on the resistive touch panel 210, and thus a controlling device (not shown in the figure) connected to the electrodes of the resistive touch panel 210 may obtain the position of the pressing by measuring voltage variations. When another finger presses on the finger 260, since the pressure of two fingers is increased, the contact area of the ITO layer 242 and the ITO layer 240 when using two fingers to press is larger than the contact area when using only the finger 260 to press. Therefore, the contact resistance between the ITO layer 242 and the ITO layer 240 is decreased. When the voltage between two electrodes (such as Y+ and Y− electrodes) of the resistive touch panel 210 is fixed (for example, the Y+ electrode is connected to +5V and the Y− electrode is grounded), if the contact resistance between the ITO layer 242 and the ITP layer 240 is decreased, the current flowing through the contact resistance is increased. Therefore, the controlling device may determine whether the pressing event (touch event) is a single-point-multi-finger gesture by measuring current variations.

Figure 3A:
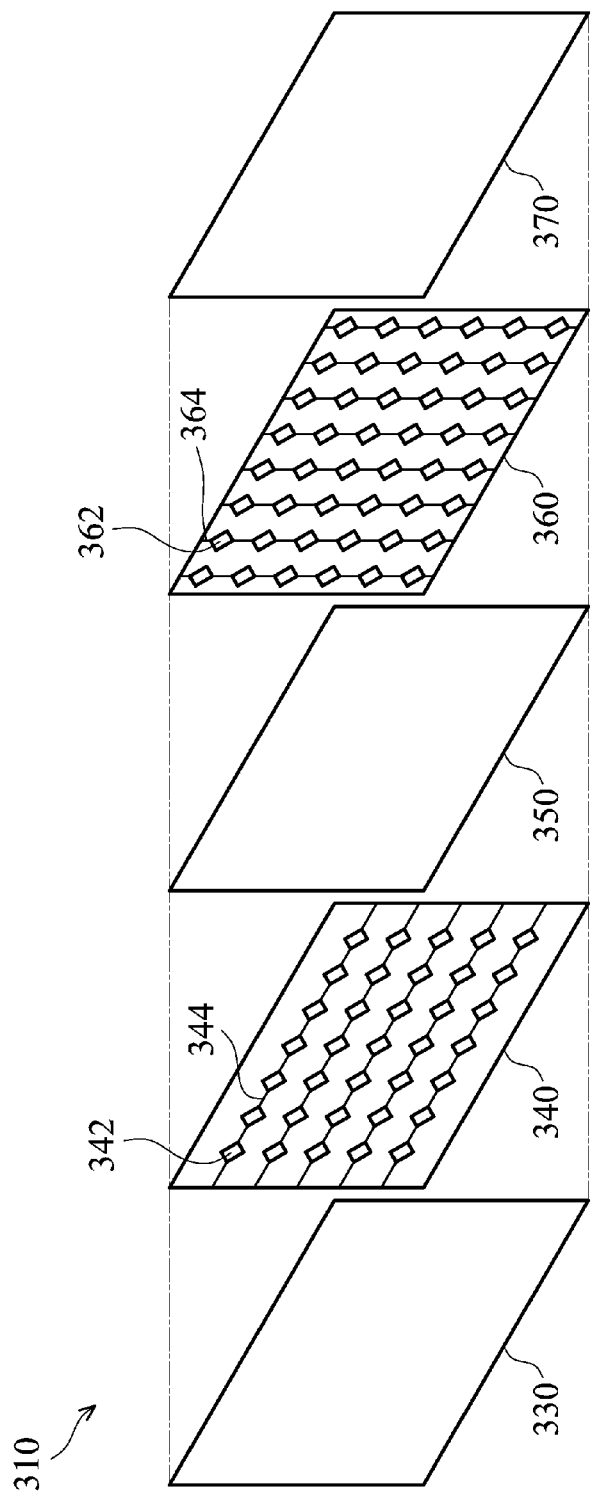
FIGS. 3a-3b are block diagrams of a capacitive touch panel.
Figure 3B:
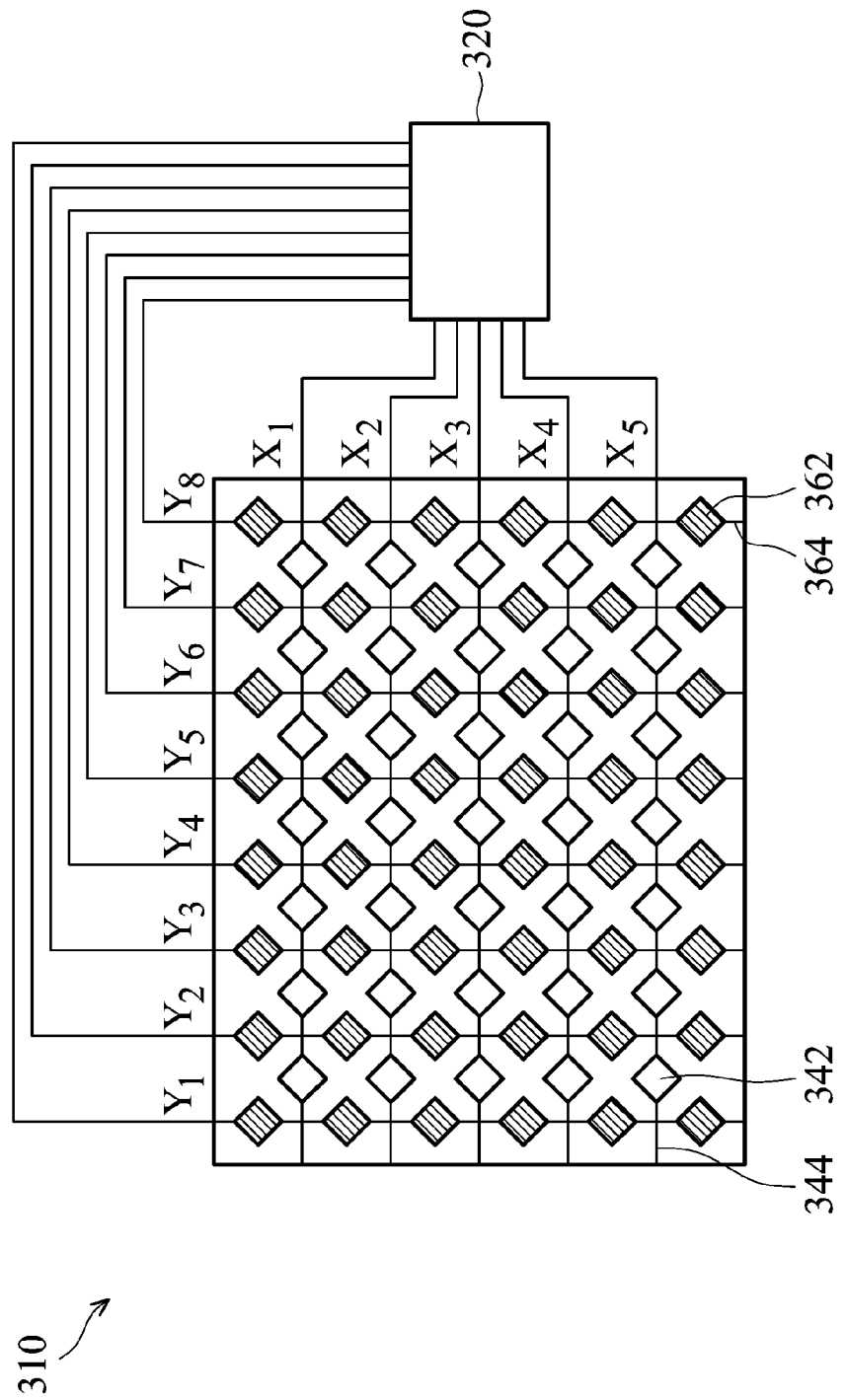

FIG. 3a is a structural block diagram of a projected capacitive touch panel 310. FIG. 3b is a top view of the projected capacitive touch panel 310. As shown in FIG. 3a, the projected capacitive touch panel 310 comprises a protective layer 330, an X-sensing layer 340, a dielectric layer 350, a Y-sensing layer 360 and a substrate 370. The X-sensing layer 340 comprises a plurality of X-sensing electrodes 342 connected in serial by a plurality of conductive lines 344 arranged along an X-axis direction to form sensing electrode rows X1~X5. The Y-sensing layer 360 comprises a plurality of Y-sensing electrodes 362 connected in serial by a plurality of conductive lines 364 arranged along Y-axis direction to form sensing electrode rows Y1~Y8. Conductive lines 344 and conductive lines 364 are connected to the controlling device 320. When a user uses a finger or a conducting material to approach or contact a first position P1 on the projected capacitive touch panel 310, the finger or the conducting material in the first position P1 and the sensing electrode form an additional capacitance, and thus the equivalent capacitance of the first position P1 is changed. Then, the controlling device 320 determines the position where the touch event has occurred, such as (X1, Y3), by measuring current variations corresponding to capacitance variations or variations of charge transfer amounts corresponding to capacitance variations. When another finger presses on the finger which originally presses on the first position P1 of the projected capacitive touch panel 310, since there are two fingers with charges pressing on the first position P1, the equivalent capacitance of the first position P1 when two fingers are pressing is larger than the equivalent capacitance of the first position P1 when only one finger is pressing. Therefore, the controlling device 320 determines whether the touch event is a single-point-multi-finger gesture by measuring current variations corresponding to capacitance variations or variations of charge transfer amounts corresponding to capacitance variations.

In addition to the resistive touch panel and the capacitive touch panel, the invention is also applied to a pressure-sensing touch panel. A controlling device of the pressure-sensing touch panel determines whether a touch event is a single-point-multi-finger gesture by measuring pressure signals which are taken as trigger signals. In addition, the invention is also applied to a touch panel combining capacitive touch technology and pressure-sensing touch technology or combining resistive touch technology and pressure-sensing touch technology. Furthermore, the invention may be applied to an optical sensing touch panel comprising layers of optical sensors arranged along a Z-axis direction. For example, an array of light sources and an array of optical sensors opposite to the array of light sources are configured on each axis of each layer. Whether a touch event is a single-point-multi-finger gesture is determined by the number of layers where the sensing of optical sensors is cut off.

FIGS. 4a-4h are block diagrams of trigger signals of single-point-multi-finger gestures according to an embodiment of the invention. In the example of the resistive touch panel 210, trigger signals are current signals corresponding to variations of contact resistance. In the example of the projected capacitive touch panel 310, the trigger signals are currents or charge transfer amounts varying corresponding to capacitance variations. In other words, at least a physical quantity is taken as the trigger signals, such as amperage or current varying correspondingly to capacitance variations or charge transfer amounts. In addition to variations of the physical quantity, measurements of variation rates of the physical quantity may be taken as the trigger signals in the invention. In an embodiment, the physical quantity and the variation rates of the physical quantity may be combined to be the trigger signals to prevent misjudgments of single-point-multi-finger gestures.

Figure 4A:
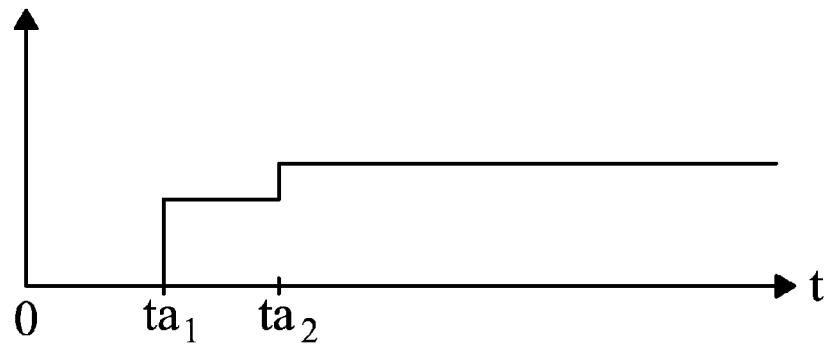
FIGS. 4a-4h are block diagrams of trigger signals of single-point-multi-finger gestures according to an embodiment of the invention.

FIG. 4a is a block diagram of a trigger signal of a first single-point-multi-finger gesture. During a time period between 0 to ta1, there's no touch event occurring, and thus the trigger signal is 0 or a base value. At time ta1, a first finger presses on a first position of a touch panel, and thus the physical quantity, i.e. the trigger signal, rises up, generating a first rapid rising. For example, when the first finger presses on the resistive touch panel 310 to make the ITO layer 242 and the ITO layer 240 have contact with each other and form a closed path, a current signal (trigger signal) of a contact resistance owing to the contact of the ITO layer 242 and the ITO layer 240 is generated. At time ta2, a second finger presses on the first finger. Since the pressure of two fingers is larger than that of only one finger, the contact resistance between the ITO layer 242 and the ITO layer 240 is decreased, and thus the current flowing through the contact resistance is increased. Therefore, the trigger signal rises for the second time. That is, the trigger signal has a second rapid rising.

In an embodiment of the invention, the controlling device of the touch panel may detect the rising of the physical quantity. At time ta1, the physical quantity rises to above a first value. At time ta2, the physical quantity rises to above a second value. Because the second value is larger than the first value, the controlling device determines that another finger is pressing at the same position. In another embodiment of the invention, the controlling device of the touch panel may detect the variation rate of the physical quantity. At time ta1, the variation rate of the physical quantity rises to above a value. At time ta2, the variation rate of the physical quantity rises to above a value, and the physical quantity is not zero and not the base value. Therefore, the controlling device determines that there is another finger pressing at the same position.

In an embodiment of the invention, the determination of "the same position" may tolerate an error value. Since single-point-multi-finger gestures may make the original touch point change a little bit, when the controlling device determines whether a variation is at the same point as the previous variation, a tolerance of an error value in distance is needed. For example, if the distance between the touched position at time ta1 and the touched position at time ta2 is within the error value, the controlling device determines that the touched positions are the same position. In one embodiment of the invention, the error value may have a default value and may be adjusted by the user.

In another embodiment of the invention, the controlling device may automatically adjust the range of the error value according to user practices. For example, if the default error value of the controlling is 5, when the practical average error value of the user is 3.5, the controlling device may automatically adjust the error value from 5 to be 7 so as to make the user have a more ample space to perform gestures. Additionally, when the practical average error value of the user is 2, the controlling device may adjust the error value from 5 to be 4 so as to make the user perform gestures accurately.

Figure 4B:
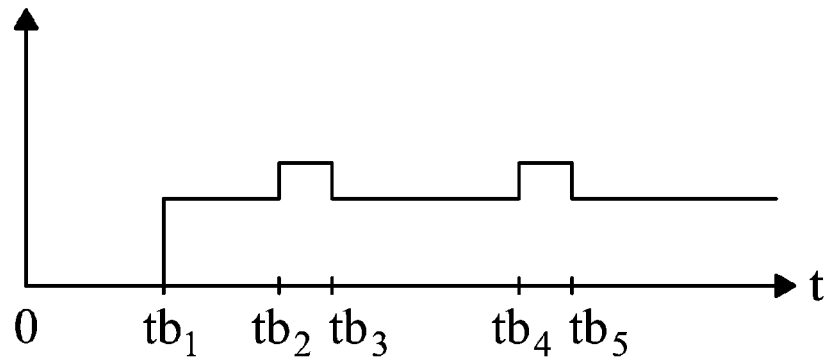

FIG. 4b is a block diagram of a trigger signal of a second single-point-multi-finger gesture. During a time period between 0 to tb1, there's no touch event occurring, and thus the trigger signal is 0. At time tb1, a first finger presses on a first position of a touch panel, and thus the trigger signal rises up, generating a first rising of the trigger signal. During a time period between tb2 to tb3, a second finger taps on the first finger, that is, at time tb2 the second finger contacts the first finger and then leaves the first finger quickly at time tb3, generating a short second rising of the trigger signal at time tb2. In this example, the second finger may tap on the first finger for more than once. For example, during a time period between tb4 and tb5 in FIG. 4b, the second finger taps on the first finger for the second time.

Figure 4C:
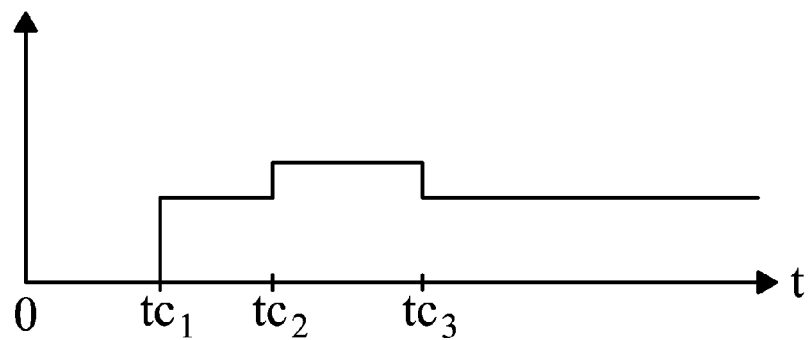

FIG. 4c is a block diagram of a trigger signal of a third single-point-multi-finger gesture. During a time period between 0 to tc1, there's no touch event occurring, and thus the trigger signal is 0. At time tc1, a first finger presses on a first position of a touch panel, and thus the trigger signal rises up, generating a first rising of the trigger signal. At time tc2, a second finger presses on the first finger, generating a second rising. At time tc3, the second finger leaves the first finger while the first finger is still on the first position. Therefore, the trigger signal goes back to the status when there is only one finger pressing on the touch panel.

Figure 4D:
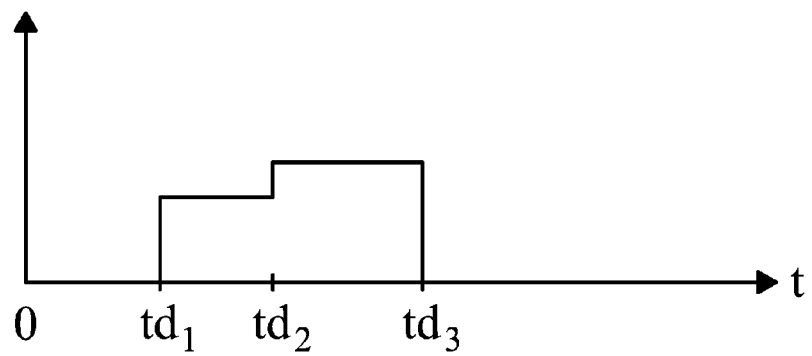

FIG. 4d is a block diagram of a trigger signal of a fourth single-point-multi-finger gesture. During a time period between 0 to td1, there's no touch event occurring, and thus the trigger signal is 0. At time td1, a first finger presses on a first position of a touch panel, and thus the trigger signal rises up, generating a first rising of the trigger signal. At time td2, a second finger presses on the first finger to generate a second rising of the trigger signal at time td2. At td3, two fingers leave the first position simultaneously, and therefore, the trigger signal goes back to 0 at time td3.

Figure 4E:
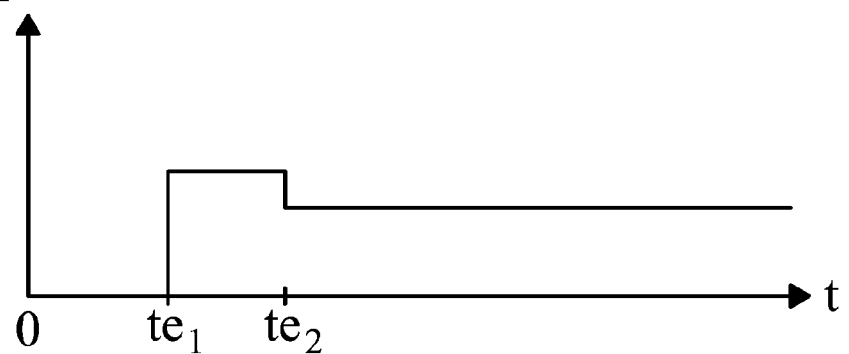

FIG. 4e is a block diagram of a trigger signal of a fifth single-point-multi-finger gesture. During a time period between 0 to te1, there's no touch event occurring, and thus the trigger signal is 0. At time te1, two finger press on a first position of a touch panel together, and thus the trigger signal rises up (the rising amplitude caused by tow fingers is larger than the rising amplitude caused by one finger), generating a first rising of the trigger signal. At time te2, one of the fingers leaves the touch panel while the other finger is still on the first position of the touch panel. Therefore, the trigger signal lowers to a non-zero status at time te2.

Figure 4F:
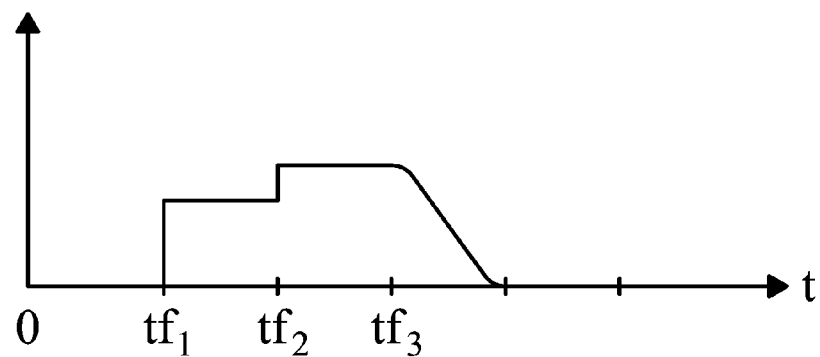
Figure 4F:
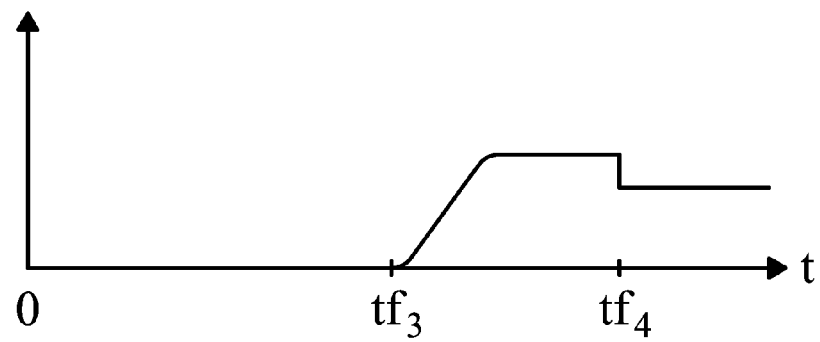

FIG. 4f is a block diagram of trigger signals of a sixth single-point-multi-finger gesture. During a time period between 0 to tf1, there's no touch event occurring in a first position of a touch panel, and thus the trigger signal of the first position is 0. At time tf1, a first finger presses on the first position, and thus the trigger signal of the first position rises up, generating a first rising of the trigger signal of the first position. At time tf2, a second finger presses on the first finger to generate a second rising of the trigger signal of the first position at time tf2. At time tf3, the first finger and the second finger start to slide (move over the surface of the touch panel without lifting them from the touch panel) to a second position of the touch panel together. Accordingly, since time tf3, the trigger signal of the first position lowers to 0, and the trigger signal of the second position rises up. At time tf4, one of the fingers leaves the touch panel while the other finger is still on the second position of the touch panel. Therefore, the trigger signal of the second position lowers to a non-zero status at time tf4.

Figure 4G:
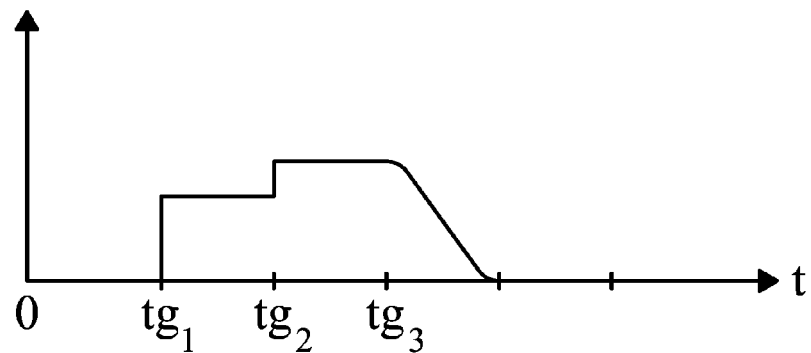
Figure 4G:
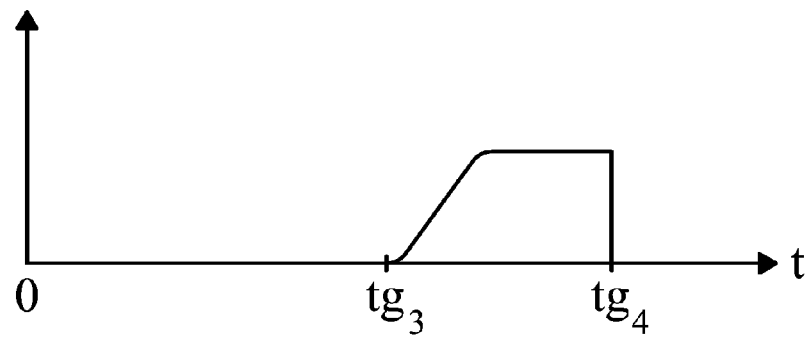

FIG. 4g is a block diagram of trigger signals of a seventh single-point-multi-finger gesture. During a time period between 0 to tg1, there's no touch event occurring in a first position of a touch panel, and thus the trigger signal of the first position is 0. At time tg1, a first finger presses on the first position, and thus the trigger signal of the first position rises up, generating a first rising of the trigger signal of the first position. At time tg2, a second finger presses on the first finger to generate a second rising of the trigger signal of the first position at time tg2. At time tg3, the first finger and the second finger start to slide to a second position of the touch panel together. Accordingly, since time tg3, the trigger signal of the first position lowers to 0, and the trigger signal of the second position rises up. At time tg4, the first finger and the second finger leave the touch panel in the second position together. Therefore, the trigger signal of the second position lowers to 0. Take the projected capacitive touch panel 310 as an example, at time tg1, the first finger presses on the first position P1 of the projected capacitive touch panel 310. Since the first position P1 is close to the sensing electrode row X1, the X1 trigger signal rises up at time tg1, as shown in the trigger signal of the first position in FIG. 4g. At time tg2, the second finger presses on the first finger, and thus the X1 trigger signal has a second rising at time tg2. At time tg3, the first finger and the second finger starts to slide to the second position P2 of the projected capacitive touch panel 310 together, and thus the X1 trigger signal starts to lower to 0. Since the second position P2 is close to the sensing electrode row X2, the X2 trigger signal rises up since time tg3, as shown in the trigger signal of the second position in FIG. 4g. At time tg4, the first finger and the second finger leaves the projected capacitive touch panel 310 together in the second position P2, and thus the X2 trigger signal lowers to 0.

Figure 4H:
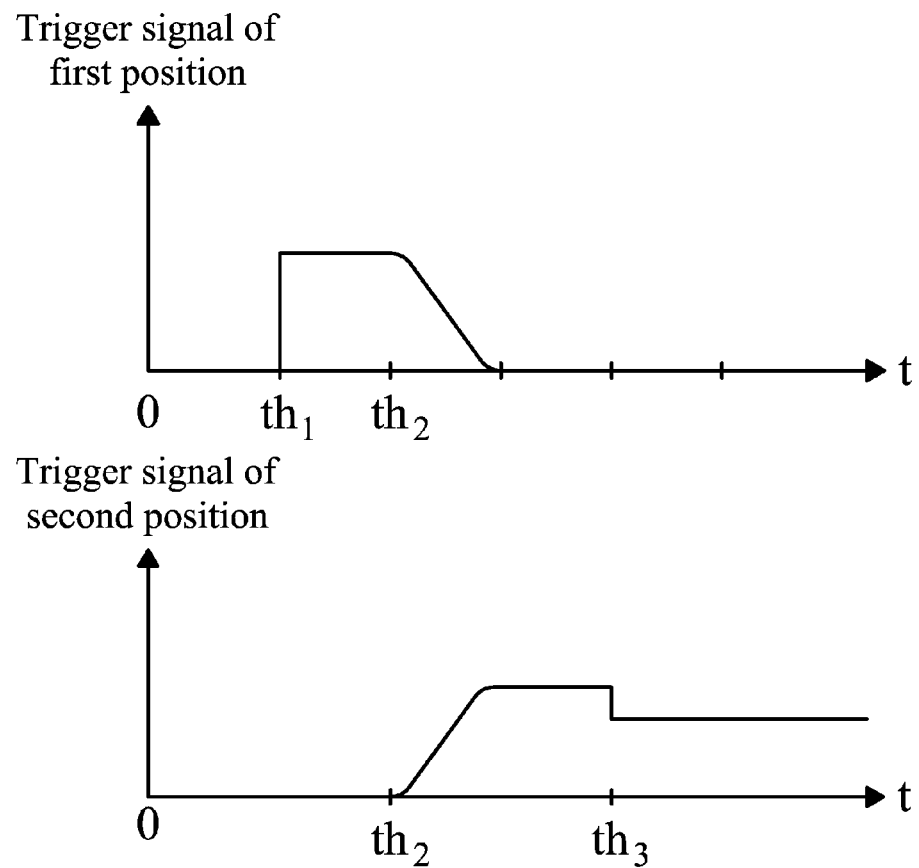

FIG. 4h is a block diagram of trigger signals of an eighth single-point-multi-finger gesture. During a time period between 0 to th1, there's no touch event occurring in a first position of a touch panel, and thus the trigger signal of the first position is 0. At time th1, two fingers press on the first position together, and thus the trigger signal rises, and the rising amplitude caused by tow fingers is larger than the rising amplitude caused by one finger. At time th2, the first finger and the second finger start to slide to a second position of the touch panel together. Accordingly, since time th2, the trigger signal of the first position lowers to 0, and the trigger signal of the second position rises up. At time th3, one of the fingers leaves the touch panel while the other finger is still on the second position of the touch panel. Therefore, the trigger signal of the second position lowers to a non-zero status.

As described above, the controlling device determines whether the touch event is one of the single-point-multi-finger gestures described above by determining whether the trigger signal has a second rising. Though single-point-multi-finger gestures of one finger is described above, the invention is also applied to the situation where fingers perform single-point-multi-finger gestures at the same time.

Figure 5:
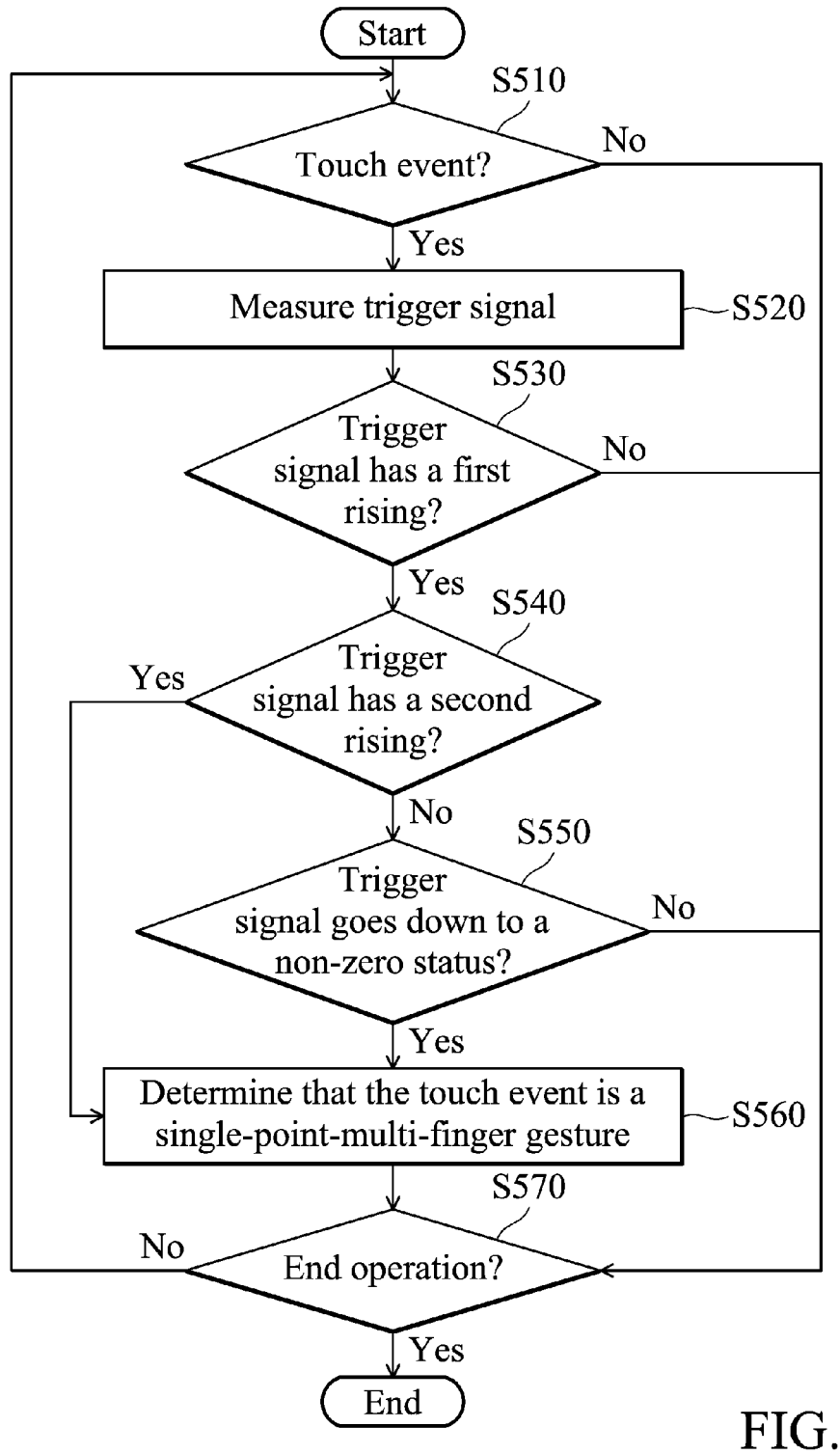
FIG. 5 is a flow chart of a method for determining single-point-multi-finger gestures of a touch sensing system according to an embodiment of the invention.

FIG. 5 is a flow chart of a method 500 for determining single-point-multi-finger gestures of a touch sensing system according to an embodiment of the invention. In step S510, whether there is a touch event occurring on a touch panel of the touch sensing system is determined. If yes, the method proceeds to step S520. If no, the method proceeds to step S570. In step S520, a controlling device of the touch sensing system measures a trigger signal corresponding to the touch event. In step S530, whether the trigger signal has a first rising is determined The "rising" in the invention is related to a variation of a physical quantity, change in the variation rate of the physical quantity or both. If the trigger signal has a first rising, for example, as shown in FIG. 4a, the trigger signal of the first position has a first rising at time ta1, it is determined that a first finger is pressing on the touch panel. In step S540, when the first rising is detected, the controlling device may output an interrupt event to all related hardware in the system to inform the hardware that the first finger is pressing on the first position. If the trigger signal does not have the first rising, the pressure of the first finger pressing on the touch panel does not exceed a threshold value, then the method proceeds to step S570. In step 570, whether the operation of the touch sensing system ends is determined If the operation of the touch sensing system ends (step S570: Yes), the method ends. If the operation of the touch sensing system does not end (step S570: No), the method goes back to step S510 to wait for the next touch event.

In step S540, whether the trigger signal has a second rising is determined If the trigger signal has a second rising (Step S540: Yes), for example, as shown in FIGS. 4a-4g, the trigger signal has the second rising at time ta2 in FIG. 4a, time tb2 in FIG. 4b, time tc2 in FIG. 4c, time td2 in FIG. 4d, time tf2 in FIG. 4f or time tg2 in FIG. 4g, it is determined that a second finger is pressing on the first finger. Therefore, the touch event is determined as a single-point-multi-finger gesture in step S560.

If the trigger signal does not have the second rising (Step S540: No), the method proceeds to step S550, In step S550, whether the trigger signal lowers to a non-zero status after the first rising is determined. If the trigger signal is lowered to the non-zero status after the first rising (Step S550: Yes), for example, as shown in FIGS. 4e and 4h, the trigger signal of the first position lowers to the non-zero status at time te2 in FIG. 4e or at time th3 in FIG. 4h, it is determined that the second finger has left the first finger on the touch panel. Therefore, the touch event is determined as a single-point-multi-finger gesture in step S560. For step S560, the controlling device may output an interrupt event to all related hardware in the system to report the relating single-point-multi-finger gesture.

If the trigger signal doesn't lower to the non-zero status after the first rising (Step S550: NO), there is no single-point-multi-finger gesture, and then the method proceeds to step S570. In step S570, whether the operation of the touch sensing system ends is determined If yes (Step S570: Yes), the method ends. If no (Step S570: No), the method goes back to step S510 to wait for the next touch event.

In another embodiment, whether the single-point-multi-finger gesture is which one of the first to eighth single-point-multi-finger gestures is determined according to trigger signals.

Though an example of one single-point-multi-finger gesture is described above, the invention is not limited thereto. According to description above, the invention may also detect two single-point-multi-finger gestures. For example, both two fingers perform single-point-multi-finger gestures. In addition, the invention may also detect a plurality of single-point-multi-finger gestures at the same time.

The invention is also applied to detecting a multi-finger gesture comprising single-point-multi-finger gestures and traditional single-point gesture. For example, a gesture where two fingers pinch without losing contact is a common multi-finger gesture usually used to zoom-in or zoom-out an image. A user may put a thumb and a middle finger on the touch panel and pinch two fingers together or move them apart. And then the user uses a fore finger to tap on the middle finger so as to perform a single-point-multi-finger gesture of the middle finger. For example, in a scroll shooting game, a user uses a middle finger to manipulate a combat aircraft on the touch panel. When user uses a fore finger to tap on the middle finger, the combat aircraft fires bullets. When the middle finger and the fore finger are still on the touch panel, the user uses his/her thumb to tap on a position of the touch panel to make the combat aircraft throw a bomb in the position. In an example of a double-player scroll shooting game, two users may simultaneously use their middle fingers to respectively manipulate two combat aircrafts on the touch panel and use their fore fingers to respectively tap on their middle fingers to make combat aircrafts fire bullets.

Examples described above are combinations of single-point-multi-finger gestures and other gestures. As shown above, the touch sensing system of the invention determines whether a touch event is a single-point-multi-finger gesture. Accordingly, the touch event is more versatile, instructions that can be made in a single point are increased, and the touch panel would have versatile functions.

Fingers are used to touch a touch panel in the above examples. The invention is also applied to a touch pen. In one embodiment, the invention provides a touch pen. The touch pen comprises at least one button. When the button is pressed, a change in described physical quantity is generated in the touch panel as a second finger presses on a first finger. In the embodiment, pressing the button is equivalent to using a second finger to contact a first finger. Accordingly, a skilled person in the art may understand how to use the touch pen to perform the first single-point-multi-finger gesture to the eighth single-point-multi-finger gesture as described above.

In another embodiment, the touch pen has a plurality of buttons. Each button generates a different variation of the physical quantity. The controlling device may determine which button is pressed according to the variation of the physical quantity.

In another embodiment, the touch panel comprises a sliding control device, which is controlled to generate a plurality of variations of the physical quantity. The controlling device may determine the input is referring to which operation according to the variation of the physical quantity. For example, the sliding control device comprises a first end, a second end, and a sliding button slides between the first end and the second end to control a variation of physical quantity. After the touch pen touches the touch panel, if the user makes the sliding button slide from the first end to the second end, the controlling device zooms out the image where the touch pen pointed according to the variation of the physical quantity. Otherwise, if the user makes the sliding button slide from the second end to the first end, the controlling device zooms in the image where the touch pen pointed according to the variation of the physical quantity.

In one embodiment, since contact area of a touch pen is different from that of a finger, the controlling device may easily determine whether the user uses the touch pen. If the touch pen is used, the controlling may reduce the error value described above (even to 0) so as to make the user accurately use the touch pen.

The invention provides a touch pen for generating single-point-multi-finger gestures. The touch pen comprises a physical quantity changing device. When the touch pen performs at least one touch event on a touch panel, the physical quantity changing device changes a physical quantity of a trigger signal corresponding to the at least one touch event and makes a controlling device of the touch panel determine that the at least one touch event is a single-point-multi-finger gesture. The physical quantity changing device further comprises one or any combination of: a first button, generating a first variation of the physical quantity, and a second button, generating a second variation of the physical quantity, wherein the first variations is different from the second variation, and a sliding control device, generating a plurality of variations of the physical quantity.

Figure 6:
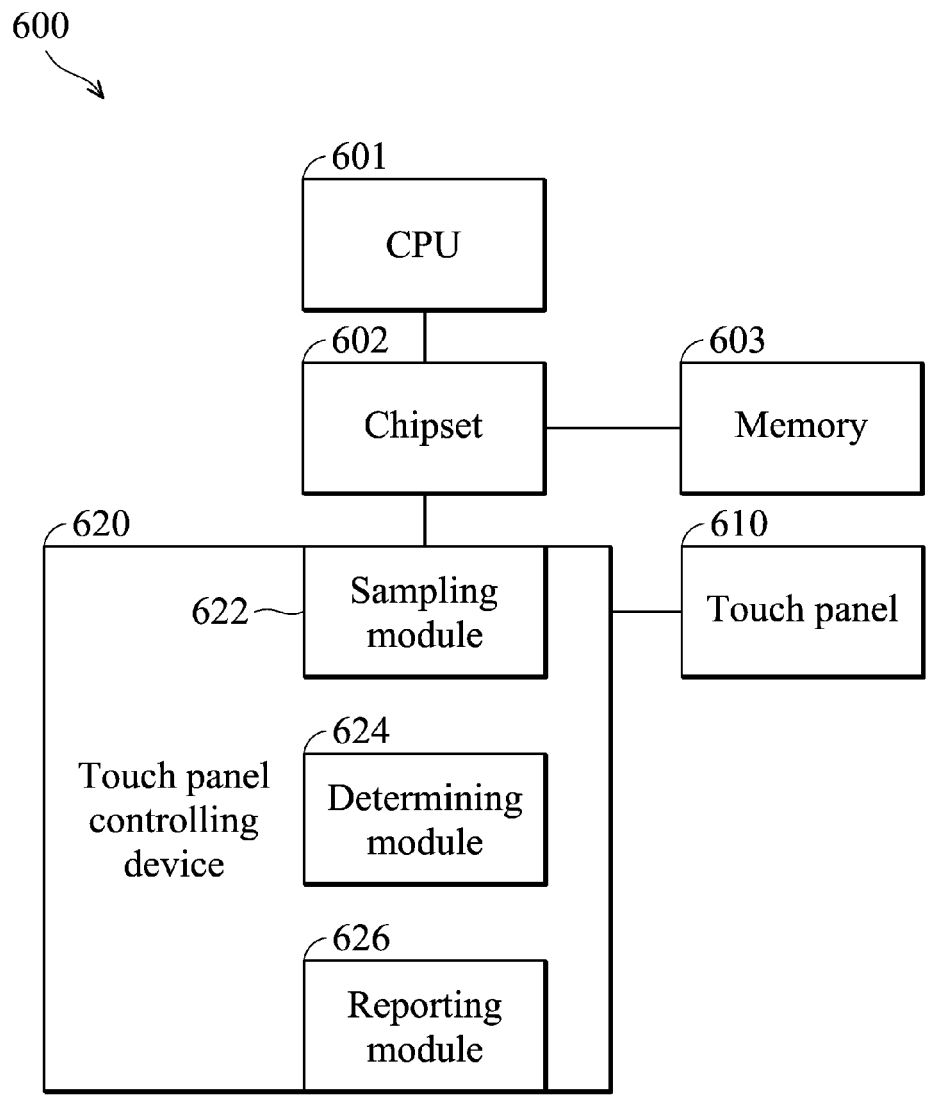
FIG. 6 is a computer system according to an embodiment of the invention.

FIG. 6 is a computer system 600 according to an embodiment of the invention. The computer system comprises a central processing unit (CPU) 601, a chipset 602, a memory 603, a touch panel 610 and a touch panel controlling device 620. The chipset 602 is connected to the CPU 601, the memory 603 and the touch panel controlling device 620. In another embodiment, the CPU 601, the chipset 602 and the touch panel controlling device 620 are integrated into the same chip. The integrated chip is also known as a system on chip (SoC) or an application processor (AP).

The touch panel controlling device 620 may be connected to the chipset 602 through a dedicated or industrial standard interface, such as PCIe (Peripheral Component Interconnect Express) or I2C (Inter-Integrated Circuit). The touch panel controlling device 620 is also connected to the touch panel 610, such as the resistive touch panel in FIG. 2 or the capacitive touch panel in FIG. 3.

The touch panel controlling device 620 may be an embedded programmable digital signal processor connected to or included a memory. When turned on, the touch panel controlling device loads software form the memory to perform a method for detecting the touch panel 610 and proposes a report of the touch event to a driver program in the implemented operating system through the chipset 602. The driver program transfer the report to the operating system, and then the operating system transfer the report to some application programs.

In an example, the touch panel controlling device 620 performs periodic scanning or periodic sampling on the touch panel 610. Then the touch panel controlling device 620 periodically obtain information from one or any combination of touch positions, physical quantity, a variation rate of the physical quantity, and whether the touch event is performed by a touch pen or not. The touch panel controlling device 620 submits the information to the driver program, and the driver program performs further determination. Then, the driver program reports at least eight type of touch events as described above to the operating system.

In another example, after the touch panel controlling device 620 obtain the information, the touch panel controlling device 620 performs determination itself and reports at least eight type of touch events as described above to the driver program. Then, the driver program transmits the report to the operating system.

For the operating system, the operating system received touch events transmitted by the driver event and does not have to care how the operation is in front-end. However, if the touch panel controlling device has its standard interface in the operating system, or if a standard driver program is used, the touch panel controlling device 620 has to directly report the touch event, not the information to be determined, to the driver program, as describe in the second example above.

The touch panel controlling device 620 comprises three modules. The invention does not limit each module to be implemented by software, hardware or combination thereof The touch panel controlling device 620 comprises a sampling module 622, a determining module 624 and a reporting module 626. The sampling module 622 samples electrical signals of the touch panel. When at least one touch event occurs on the touch panel, the sampling module 622 generates at least one trigger signal corresponding to the at least one touch event. The determining module 624 determines whether the at least one touch event is a single-point-multi-finger gesture according to a position of the at least one trigger signal and the sampled physical quantity. When the determining module 624 determines that the at least one touch event is the single-point-multi-finger gesture, the reporting module 626 reports the at least one touch event.

Figure 7:
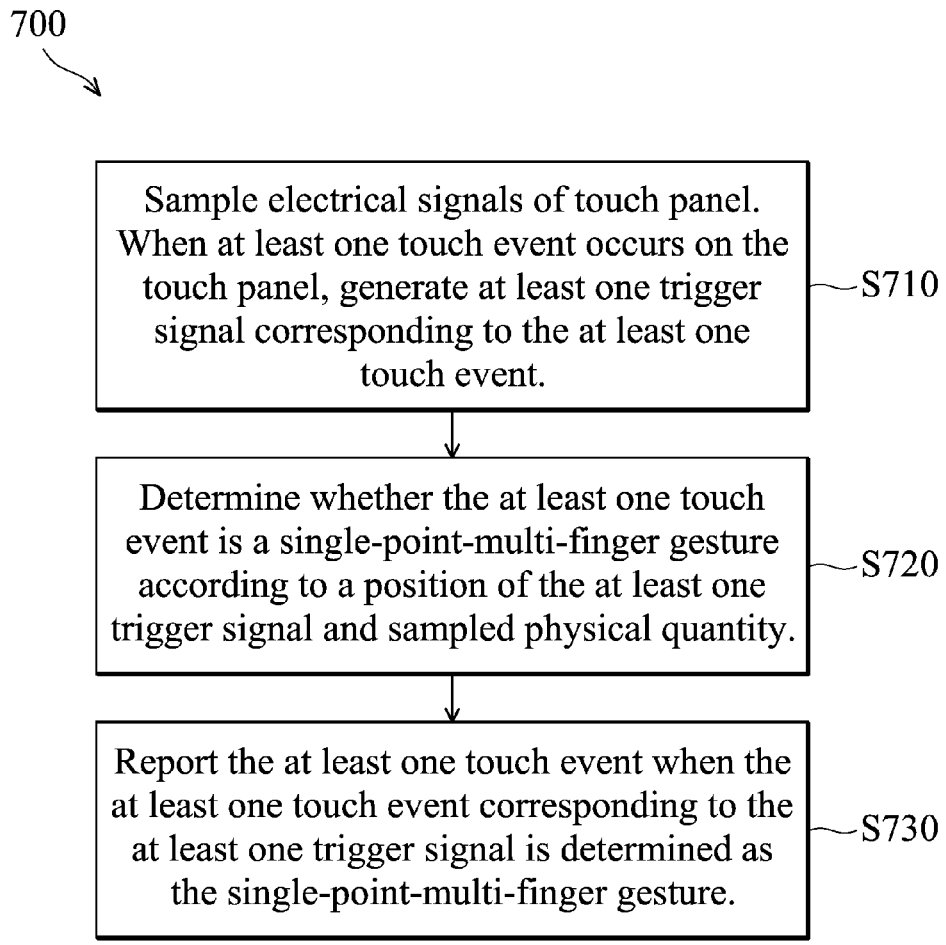
FIG. 7 is a flow chart of a method for determining single-point-multi-finger gestures.

FIG. 7 is a flow chart of a method 700 for determining single-point-multi-finger gestures. The method 700 is applied to a touch panel. In step S710 of the method 700, electrical signals of touch panel is sampled, and when at least one touch event occurs on the touch panel, at least one trigger signal corresponding to the at least one touch event is generated. Then, in step S720, whether the at least one touch event is a single-point-multi-finger gesture is determined according to a position of the at least one trigger signal and sampled physical quantity. Finally, in step S730, the at least one touch event is reported when the at least one touch event corresponding to the at least one trigger signal is determined as the single-point-multi-finger gesture.

In step S720, the determination is further based on one or any combination of: a variation rate of the physical quantity; an error value of the position; and a result of determining whether the at least one touch event is performed by a touch pen.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A controlling device applied to a touch panel, comprising:
   a sampling module implemented by hardware, sampling electrical signals of the touch panel, and when at least one touch event occurs on the touch panel, generating a trigger signal corresponding to the at least one touch event;

a determining module, determining whether the at least one touch event is a single-point-multi-finger gesture according to a position of the trigger signal and a number of risings of the trigger signal at the position, wherein the risings of the trigger signal correspond to sampled physical quantity; and a reporting module, reporting the at least one touch event when the determining module determines that the at least one touch event corresponding to the trigger signal is the single-point-multi-finger gesture, wherein the trigger signal comprises a first rising at a first time and a second rising at a second time, and the first time and the second time are different, and the first rising and the second rising occur at the same position.

2. The controlling device as claimed in claim 1, wherein the single-point-multi-finger gesture comprises one or any combination of:

a first single-point-multi-finger gesture, wherein after a finger contacts a first position of the touch panel, at least one other finger presses on the finger;

a second single-point-multi-finger gesture, wherein after the finger contacts the first position of the touch panel, another finger taps on the finger at least once;

a third single-point-multi-finger gesture, wherein after the finger contacts the first position of the touch panel, at least one other finger presses on the finger, and then the at least one other finger leaves the finger in the first position;

a fourth single-point-multi-finger gesture, wherein after the finger contacts the first position of the touch panel, at least one other finger presses on the finger, and then the finger and the at least one other finger leave the touch panel in the first position; and a fifth single-point-multi-finger gesture, wherein after the finger and at least one other finger contact the first position of the touch panel, the at least one other finger leaves the finger in the first position.

3. The controlling device as claimed in claim 1, wherein the determining module performs a determination according to one or any combination of:

a variation rates of the physical quantity;

an error value of the position; and a result of determining whether the at least one touch event has been performed by a touch pen.

4. The controlling device as claimed in claim 1, wherein the determining module further determines whether the at least one touch event corresponding to the trigger signal is a multi-point gesture, wherein the multi-point gesture comprises at least one single-point-multi-finger gesture.

5. A method for determining single-point-multi-finger gestures, applied to a touch panel, comprising:

sampling electrical signals of the touch panel, and when at least one touch event occurs on the touch panel, generating a trigger signal corresponding to the at least one touch event;

determining whether the at least one touch event is a single-point-multi-finger gesture according to a position of the trigger signal and a number of risings of the trigger signal at the position, wherein the risings of the trigger signal correspond to sampled physical quantity; and reporting the at least one touch event when the at least one touch event corresponding to the trigger signal is determined as the single-point-multi-finger gesture, wherein the trigger signal comprises a first rising at a first time and a second rising at a second time, and the first time and the second time are different, and the first rising and the second rising occur at the same position.

6. The method as claimed in claim 5, wherein the single-point-multi-finger gesture comprises one or any combination of:

a first single-point-multi-finger gesture, wherein after a finger contacts a first position of the touch panel, at least one other finger presses on the finger;

a second single-point-multi-finger gesture, wherein after the finger contacts the first position of the touch panel, another finger taps the finger at least once;

a third single-point-multi-finger gesture, wherein after the finger contacts the first position of the touch panel, at least one other finger presses on the finger, and then the at least one other finger leaves the finger in the first position;

a fourth single-point-multi-finger gesture, wherein after the finger contacts the first position of the touch panel, at least one other finger presses on the finger, and then the finger and the at least one other finger leave the touch panel in the first position; and a fifth single-point-multi-finger gesture, wherein after the finger and at least one other finger contact the first position of the touch panel, the at least one other finger leaves the finger in the first position.

7. The method as claimed in claim 5, wherein whether the at least one touch event is a single-point-multi-finger gesture is further determined according to one or any combination of:

a variation rates of the physical quantity;

an error value of the position; and a result of determining whether the at least one touch event has been performed by a touch pen.

8. The method as claimed in claim 5, further comprising:

determining whether the at least one touch event corresponding to the trigger signal is a multi-point gesture, wherein the multi-point gesture comprises at least one single-point-multi-finger gesture.

9. The controlling device as claimed in claim 1, wherein the trigger signal comprises at least one of:

a first trigger signal, comprising the first rising at the first time and the second rising at the second time;

a second trigger signal, comprising the first rising at the first time, the second rising at the second time, and a first falling at a third time;

a third trigger signal, comprising the first rising at the first time, the second rising at the second time, the first falling at the third time, a third rising at a fourth time, and a second falling at a fifth time.

10. The method as claimed in claim 5, wherein the trigger signal comprises at least one of:

a first trigger signal, comprising the first rising at the first time and the second rising at the second time;

a second trigger signal, comprising the first rising at the first time, the second rising at the second time, and a first falling at a third time;

a third trigger signal, comprising the first rising at the first time, the second rising at the second time, the first falling at the third time, a third rising at a fourth time, and a second falling at a fifth time.

11. A controlling device applied to a touch panel, comprising:

a sampling module implemented by hardware, sampling electrical signals of the touch panel, and when at least one touch event occurs on the touch panel, generating at least one trigger signal corresponding to the at least one touch event;

a determining module, determining whether the at least one touch event is a single-point-multi-finger gesture according to a position of the at least one trigger signal and sampled physical quantity; and a reporting module, reporting the at least one touch event when the determining module determines that the at least one touch event corresponding to the at least one trigger signal is the single-point-multi-finger gesture, wherein the at least one trigger signal comprises one of:

a first trigger signal, comprising a first rising at a first time and a second rising at a second time;

a second trigger signal, comprising the first rising at the first time, the second rising at the second time, and a first falling at a third time;

a third trigger signal, comprising the first rising at the first time, the second rising at the second time, the first falling at the third time, a third rising at a fourth time, and a second falling at a fifth time;

a fourth trigger signal and a fifth trigger signal, wherein the fourth trigger signal comprises the first rising at the first time, the second rising at the second time, and the first falling at the third time, and wherein the fifth trigger signal comprises the third rising at the third time and the second falling at the fourth time;

a sixth trigger signal and a seventh trigger signal, wherein the sixth trigger signal comprises the first rising at the first time and the first falling at the second time, and wherein the seventh trigger signal comprises the second rising at the second time and the second falling at the third time; and an eighth trigger signal, comprising the first rising at the first time and the first falling at the second time, wherein the eighth trigger signal lowers to a non-zero status at the first falling at the second time.

12. A method for determining single-point-multi-finger gestures, applied to a touch panel, comprising:

sampling electrical signals of the touch panel, and when at least one touch event occurs on the touch panel, generating at least one trigger signal corresponding to the at least one touch event;

determining whether the at least one touch event is a single-point-multi-finger gesture according to a position of the at least one trigger signal and sampled physical quantity; and reporting the at least one touch event when the at least one touch event corresponding to the at least one trigger signal is determined as the single-point-multi-finger gesture, wherein the at least one trigger signal comprises one of:

a first trigger signal, comprising a first rising at a first time and a second rising at a second time;

a second trigger signal, comprising the first rising at the first time, the second rising at the second time, and a first falling at a third time;

a third trigger signal, comprising the first rising at the first time, the second rising at the second time, the first falling at the third time, a third rising at a fourth time, and a second falling at a fifth time;

a fourth trigger signal and a fifth trigger signal, wherein the fourth trigger signal comprises the first rising at the first time, the second rising at the second time, and the first falling at the third time, and wherein the fifth trigger signal comprises the third rising at the third time and the second falling at the fourth time;

a sixth trigger signal and a seventh trigger signal, wherein the sixth trigger signal comprises the first rising at the first time and the first falling at the second time, and wherein the seventh trigger signal comprises the second rising at the second time and the second falling at the third time; and an eighth trigger signal, comprising the first rising at the first time and the first falling at the second time, wherein the eighth trigger signal lowers to a non-zero status at the first falling at the second time.

13. The controlling device as claimed in claim 1, wherein the first rising is caused by a first finger at a first position of the touch panel and the second rising is caused by the first finger and a second finger at the first position of the touch panel.

14. The controlling device as claimed in claim 1, wherein the first rising is caused by a first number of fingers and the second rising is caused by a second number of fingers, and the first number of fingers is less than the second number of fingers.

\* \* \* \* \*